United States Patent [19]

Paz

[11] Patent Number: 4,908,211
[45] Date of Patent: Mar. 13, 1990

[54] CHEWING GUM AND INGREDIENTS TO CHEMICALLY INHIBIT FORMATION OF PLAQUE AND CALCULUS

[76] Inventor: Armando F. Paz, 1475 S. Miami Ave., Miami, Fla. 33130

[21] Appl. No.: 204,652

[22] Filed: Jun. 9, 1988

Related U.S. Application Data

[63] Continuation-in-part of Ser. No. 904,550, Sep. 8, 1986, abandoned.

[51] Int. Cl.$^4$ .............................................. A23G 3/30
[52] U.S. Cl. ..................................... 424/440; 424/48; 424/49; 424/57; 424/58; 424/601; 424/606; 426/3; 426/74
[58] Field of Search ................................ 426/3-6, 426/74; 424/440, 441, 435, 49, 48, 57, 52, 151, 128, 58

[57] References Cited

U.S. PATENT DOCUMENTS

| 2,525,072 | 12/1947 | Kearby | 424/48 |
| 2,700,012 | 1/1955 | Merckel | 424/48 |
| 3,655,866 | 4/1972 | Bilotti | 424/70 |
| 4,233,288 | 11/1980 | Cornell | 424/48 |
| 4,265,877 | 5/1981 | Tenta | 424/48 |
| 4,291,045 | 9/1981 | Mackay | 424/48 |
| 4,419,346 | 12/1983 | Stroz, et al. | 424/151 |
| 4,472,437 | 9/1984 | Corsello | 426/3 |
| 4,474,749 | 10/1984 | Kruppa | 424/48 |
| 4,563,345 | 1/1986 | Arrick | 424/48 |

Primary Examiner—Jeanette Hunter
Attorney, Agent, or Firm—Malloy & Malloy

[57] ABSTRACT

Chewing gum or a chewable confection including either sanguinarine, benzophenanthridine alkaloid, or soluble poly-pyrophosphates, or both to chemically inhibit the formation of plaque and calculus.

14 Claims, No Drawings

CHEWING GUM AND INGREDIENTS TO CHEMICALLY INHIBIT FORMATION OF PLAQUE AND CALCULUS

This application is a continuation-in-part of my earlier field and pending U.S. application Ser. No. 904,550.

FIELD OF THE INVENTION

This invention relates to chewing gum in particular and confections in general, which includes in it: soluble poly-pyrophosphates and sanguinarine (a benzophenanthridine alkaloid).

SUMMARY OF THE INVENTION

This invention is of a chewing gum product in which the 2 chemicals referred to in the preceding paragraph work to chemically inhibit the formation of plaque and calculus.

The consequences of plaque and calculus build-up are periodontal disease, carries, and tooth staining.

Dental plaque is the organic film which develops on the salivary pellicle that coats the teeth, tongue cheeks, roof, and floor of the mouth. This organic film is composed of bacteria and their products. Dental plaque is a chemically complex and dynamic ecological system.

Dental plaque is divided into two major types: supragingival and subgingival. Dental plaque does its damage on the teeth, gums, and bone, by breaking down dietary carbohydrates through the process of glycolysis, thereby decreasing the plaque pH into the acidic range. When the pH of plaque is in the acidic range it breaks down teeth, gums, and supporting bone.

Furthermore, if the dental plaque is not removed, the presence of crystalline foci start to develop. within the plaque layer. This crystallization of plaque is called calculus. Calculus, like plaque, is formed supragingically and subgininally. If not removed, these deposits cause inflammation and breakdown of the supportive tissues of teeth.

In the broadest description this invention is directed at the chemical inhibitions of the formation of plaque and calculus in the oral cavity.

Specifically, the invention involves a process of incorporating ingredients into the gum base that affect and interfere with the normal chemical development of plaque and calculus in the oral cavity.

The ingredients are sanguinarine (a benzophenanthridine alkaloid) and the soluble poly-pyrophosphates.

Sanguinarine is a new effective plaque inhibiting agent. Sanguinarine is an extract taken from the blood root plant (and has never been used in a gum base in the prior art). The use of sanguinarine in a gum base, to produce an effective oral health delivery system, is new and unique to the field of chewing gum and confections. Sanguinarine works by interfering with the bacteria's ability to convert carbohydrates into gum-eating acids. In other words, it is antiglycolytic in saliva. Sanguinarine also blocks the enzymes that destroy collagen in gum tissue. Sanguinarine becomes absorbed by plaque, the tongue surface, and salivary sediment, whereby the sanguinarine is effective for up to one or two hours.

The soluble poly-pyrophosphates are crystal-growth inhibitors that chemically interrupt the transformation of amorphous calcium phosphate into dental calculus. The soluble poly-pyrophosphates have also been shown to chemically reduce the amount of calculus and the number of sites affected with calculus in the oral cavity.

THE INVENTION AND MANNER AND PROCESS OF MAKING AND USING IT IN A CLEAR CONCISE MANNER

In a first example the following ingredients are utilized:

| Ingredients | Percent |
|---|---|
| Gum base | 20 |
| Sorbitol/xylitol powder | to 1100 |
| Sorbitol/xylitol syrup | 20 |
| Mannitol | 10 |
| Lecithin | .5 |
| Flavor | 1 |
| Soluble poly-pyrophosphate | .5 to 1 |
| Sanguinarine | .5 to 1 |

EXAMPLE #2

Sugarless Gum

| Ingredients | Percent |
|---|---|
| Gum base | 25 |
| Xylitol syrup | 18 |
| Crystaline | to 200 |
| Clycerine | 5 |
| Mannitol | 15 |
| Artificial sweetener | 1.5 |
| Flavoring and coloring | 1 |
| Soluble poly-pyrophosphate | .5 to 1 |
| Sanguinarine | .5 to 1 |

EXAMPLE #3

Bubble Gum

| Ingredients | Percent |
|---|---|
| Gum Base | 10 |
| Icing sugar | 68 |
| Glucose syrup | 16 |
| Glycerine | 3 |
| Flavoring and coloring | 1 |
| Sanguinarine | .5 to 1 |
| Soluble poly-pyrophosphate | .5 to 1 |

PROCEDURE FOR FABRICATING GUM (A) Melt gum base in a steam jacketed kettle.
(B) Cool to 180° F., add lecithin and flavor, mix for 2 minutes.
(C) Add sorbitol syrup, mix for 2 minutes.
(D) Mix the sanguinarine, soluble polypyrophosphates and artificial sweetener together.
(Add the above mentioned additives to gum base mixture and mix for 5 minutes.
(F) Remove from kettle, bench cool.
(G) Roll, score, and cut the gum.

EXAMPLE #4

Hard candy (Caramels)

Ingredients:
240 ml of butter
540 ml of granulated sugar
1.25 ml of salt
240 ml of light corn syrup
320 ml sweetened condensed milk
5 ml of vanilla or chocolate
0.5 to 1% of sanguinarine 0.5 to 1% of poly-pyrophosphate

PROCEDURE FOR MAKING CARAMEL (A) Melt butter, add sugar and salt, stir until blended.
(B) Add corn syrup and stir constantly, gradually adding the milk.
(C) Cook over moderate heat 120° C. until the mixture get a firm consistency.
(D) Remove from heat, add sanguinarine, poly-pyrophosphate, and vanilla or chocolate.
(E) Quickly spread into lightly greased pan, wait for it to cool.
(F) Cut into 1" squares and wrap caramel in wax or plastic wrap.

The sanguinarine is in the form of pure sanguinaria extract or a combination of sanguinaria and zinc chloride.

This invention incorporates two ingredients that chemically attack plaque and calculus in a chewing gum/confection; thereby providing a safe, pleasant, and convenient method of complementing tooth-brushing and flossing between professional visits.

This gum/confection is effective because (1) it helps normalize interproximal plaque PH after acidogenic snack food is ingested—compared to not chewing the gum—and after cessation of gum chewing the plaque pH will be above cariogenic potential. (2) The gum helps inhibit the formation of plaque. (3) The gum helps depress the formation of calculus deposits in rapid calculus formers, and in slow calculus formers the calculus deposits are less mineralized.

This invention uses two new chemicals to inhibit the formation of plaque and calculus. There is no evidence in the Prior Art of the use of these ingredients and the means in which they work.

By using the soluble poly-pyrophosphates and sanguinarine this invention inhibits both the formation of plaque and its by product caluclus at the same time.

The biochemical reason that the gum of this application with its use of soluble poly-pyrophosphates retains its anti-calculus effect in the presence of the oral enzyme phosphatase is the following. The soluble poly-pyrophosphates are remarkably stable in the presence of oral phosphatase. The enzyme phosphatase does hydrolize the soluble poly-pyrophates but only to the pyrophosphate and diphosphonate stage.

What is claimed is:

1. A chewing gum comprising gum base and sanguinarine, in an amount effective to inhibit plaque formation.
2. The chewing gum as set forth in claim 1 wherein the sanguinarine is a pure extract.
3. The chewing gum as set forth in claim 1 which additionally includes zinc chloride.
4. The chewing gum as set forth in claim 1 wherein the poly-pyrophosphates are selected from the group consisting of tetrasodium pyro-phosphate, tetrapotassium pyro-phosphate or disodium dihydrogen pyro-phosphate.
5. The chewing gum as set forth in claim 4 wherein the poly-pyrophosphate is in a sodium fluoride silica base.
6. A chewing gum comprising gum base and poly-pyrophosphates, in an amount effective to inhibit plaque formation.
7. A chewing gum comprising gum base, sanguinarine and poly-pyrophosphates, in amounts effective to inhibit plaque formation.
8. A chewable confectionary product comprising a chewable confection and sanguinarine, in an amount effective to inhibit plaque formation.
9. The confection as set forth in claim 8 wherein the sanguinarine is a pure extract.
10. The confection as set forth in claim 8 which additionally includes zinc chloride.
11. A chewable confectionary product comprising a chewable confection and poly-pyrophosphates, in an amount effective to inhibit plaque formation.
12. The confection as set forth in claim 8 wherein the poly-pyrophosphates are selected from the group consisting of tetrasodium pyro-phosphate, tetrapotassium pyro-phosphate or disodium dihydrogen pyro-phosphate.
13. A chewing gum as set forth in claim 12 wherein the poly-pyrophosphate is in a sodium fluoride silica base.
14. A chewable confectionary product comprising a chewable confection, sanguinarine and poly-pyrophosphates, in an amount effective to inhibit plaque formation.

* * * * *